Feb. 14, 1933.　　　　I. KITROSER　　　　1,897,262
CINEMATOGRAPHIC OBJECTIVE
Filed Oct. 13, 1930
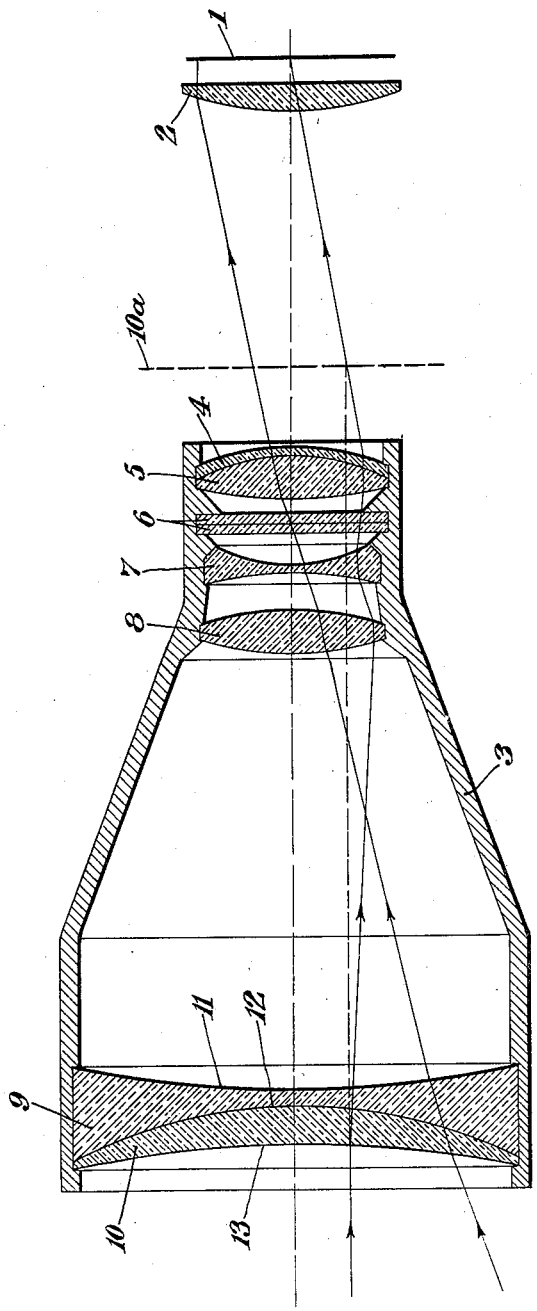
INVENTOR
Isaac Kitroser
BY
Arthur Wright
ATTORNEY Patented Feb. 14, 1933

1,897,262

UNITED STATES PATENT OFFICE

ISAAC KITROSER, OF PARIS, FRANCE, ASSIGNOR TO KELLER-DORIAN COLORFILM CORPORATION, OF NEW YORK, N. Y., A CORPORATION OF DELAWARE

CINEMATOGRAPHIC OBJECTIVE

Application filed October 13, 1930. Serial No. 488,305.

The present invention has for its object the transforming of the ordinary photographic objective into an objective with a very wide angle. The present invention places before the ordinary objective an additional lens which provides a wide angle for the lens. The quality of the new objective can be used to advantage with all kinds of films but it is very advantageous for taking pictures with a goffered film for cinematography. The principle of collimation requires the employment of a collimatric lens near the film. It is advantageous in such constructions although the color filter is placed at the focus of the collimatric lens, to provide an objective which will give a very long focus for the collimatric lens. In the present improvement, I have invented a system which has a very wide angle field for the objective and a very long focus for the collimatric lens.

While my invention is capable of embodiment in many different forms, by way of illustration I have shown only one embodiment of my invention in the accompanying drawing, in which The figure is a transverse section of an objective made in accordance with my invention.

In the drawing, I have shown a goffered film 1, having in front thereof a collimatric lens 2, in front of which I place an objective comprising a mounting 3 containing an ordinary photographic objective comprising as the posterior lenses a coconcavo-convex lens 4, a bi-convex lens 5, a color filter 6, comprising two glass plates having between them a color layer comprising three parallel bands of equal area which are respectively blue, green and red; and containing as the anterior lenses, a concavo-concave lens 7 and a bi-convex lens 8. It is to be understood that many other types of ordinary objectives can be used for this purpose. In front of the said ordinary objective, furthermore, I place a negative lens system which I place in the anterior focal plane or in front of the anterior focal plane of the said ordinary objective. This is comprised of a bi-concave lens 9 and a concavo-convex lens 10. In constructing the complete objective, where $f$ is the focus of the negative objective 9, 10 and $f_1$, the focus of the ordinary objective 4, 5, 7, 8 and the distance between the principal planes of the ordinary objective and the negative objective is E, the total focus of the new objective comprising the ordinary objective and the negative objective is $$F = f_1 \frac{f}{f_1 + f - E}$$

When $E = f_1$, that is when the negative lens is placed in the focal plane of the ordinary objective, $$F = f_1$$

If, however, $E > f_1$ and $f < o$, or less than $o$, then $F < f_1$ because the factor $$\frac{f}{f_1 + f - E} < 1$$

Consequently, when the negative lens is placed before the focal plane of the ordinary lens the total focus of these combined objectives is shortened, and the principal plane of the entire objective would be located at 10a. When the total focus is thus shortened, the field becomes widened. In other words, the collimatric lens 2 has ordinarily, when used with the ordinary objective, substantially the same focus as the focus of the ordinary objective. But, now in my combined objective the focus of the collimatric lens is approximately $x$, $$x = f_1 \frac{E + f}{f - f_1 + E}$$

or that $$\frac{E + f}{f - f_1 + E} > 1$$

Therefore, $x > f_1$, because of the fact that $$\frac{E + f}{f - f_1 + E} = 1 + \frac{f_1}{E + f - f_1}$$

With these mathematical formulæ, a lens can be constructed and the new objective as desired can be determined.

For example, I can transform an ordinary cinematographic objective of $f_1 = 35.$ mm. and $f/2$ opening into a new objective made in accordance with my invention by placing in front of the said objective, a negative objective having a focus of $$f = -100 \text{ mm.}$$

with the distance between the principal planes $$E = 51.67 \text{ mm.}$$

The new combined objective now has a total focus $$F = 30 \text{ mm.}$$

and the collimatric lens of this objective will have accordingly a new focus $$x = 45.5.$$

In the above example, the negative objective would, for example, be as follows: The radius of curvature of the near face 11, $R_1$, $$R_1 = -77.9 \text{ mm.},$$

the radius of curvature of the surface 12, $R_2$, $$R_2 = +36 \text{ mm.},$$

and the radius of curvature of the surface 13, $R_3$, $$R_3 = +89.1 \text{ mm.}$$

The thickness of the center of the lens 9, $e_1$, would be $$e_1 = 2 \text{ mm.},$$

and the central thickness of the lens 10, $e_2$, $$e_2 = 7.1 \text{ mm.}$$

Preferably, the lens 9 is made of borosilicate crown glass and the lens 10 is made of very heavy flint glass. This arrangement corrects the negative lens for spherical aberration and achromatism.

The lens 9, 10 is preferably itself corrected for spherical aberration and achromatism and for coma, but if not itself corrected for coma, to correct it for the coma in another way it is necessary to widen the distance separating the lenses 4, 5 from the lens 7 and 8. This distance may, for example, be increased by 4 mm., and the coma will then have disappeared.

It is to be understood, however, that many changes can be made in this construction, and that, for example, the negative objective can be made of a different number and arrangement of the lenses than those shown in the drawing.

While I have described my invention above in detail, it is to be understood that many changes may be made therein without departing from the spirit of my invention.

I claim:

1. A photographic objective, comprising a collimatric lens, an ordinary objective adapted for use therewith and a negative lens located in the neighborhood of the anterior focal plane of the ordinary objective.

2. A photographic objective, comprising a collimatric lens, an ordinary objective adapted for use therewith and a negative lens located in front of the anterior focal plane of the ordinary objective.

3. A photographic objective, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective.

4. A photographic objective, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective.

5. In combination, a goffered film, a color filter and a photographic objective, comprising a collimatric lens, an ordinary objective adapted for use therewith and a negative lens located in the neighborhood of the anterior focal plane of the ordinary objective.

6. In combination, a goffered film, a color filter and a photographic objective, comprising a collimatric lens, an ordinary objective adapted for use therewith and a negative lens located in front of the anterior focal plane of the ordinary objective.

7. In combination, a goffered film, a color filter and a photographic objective, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective.

8. In combination, a goffered film, a color filter and a photographic objective, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective.

9. A photographic objective corrected for coma, comprising a collimatric lens, an ordinary objective adapted for use therewith and a negative lens located in the neighborhood of the anterior focal plane of the ordinary objective.

10. A photographic objective corrected for coma, comprising a collimatric lens, an ordinary objective adapted for use therewith and a negative lens located in front of the anterior focal plane of the ordinary objective.

11. A photographic objective corrected for coma, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective.

12. A photographic objective corrected for coma, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective.

13. In combination, a goffered film, a color filter and a photographic objective, corrected for coma, comprising a collimatric lens, an ordinary objective adapted for use therewith and a negative lens located in the neighborhood of the anterior focal plane of the ordinary objective.

14. In combination, a goffered film, a color filter and a photographic objective corrected for coma, comprising a collimatric lens, an ordinary objective adapted for use therewith and a negative lens located in front of the anterior focal plane of the ordinary objective.

15. In combination, a goffered film, a color filter and a photographic objective corrected for coma, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective.

16. In combination, a goffered film, a color filter and a photographic objective corrected for coma, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective.

17. A photographic objective corrected for coma, comprising a collimatric lens, an ordinary objective adapted for use therewith and a negative lens located in the neighborhood of the anterior focal plane of the ordinary objective, the correction for coma being made by locating the posterior lenses of the ordinary objective farther away from the anterior lenses thereof.

18. A photographic objective corrected for coma, comprising ι collimatric lens, an ordinary objective adapted for use therewith and a negative lens located in front of the anterior focal plane of the ordinary objective, the correction for coma being made by locating the posterior lenses of the ordinary objective farther away from the anterior lenses thereof.

19. A photographic objective corrected for coma, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective, the correction for coma being made by locating the posterior lenses of the ordinary objective farther away from the anterior lenses thereof.

20. A photographic objective corrected for coma, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective, the correction for coma being made by locating the posterior lenses of the ordinary objective farther away from the anterior lenses thereof.

21. In combination, a goffered film, a color filter and a photgraphic objective, corrected for coma, comprising a collimatric lens, an ordinary objective adapted for use therewith and a negative lens, located in the neighborhood of the anterior focal plane of the ordinary objective, the correction for coma being made by locating the posterior lenses of the ordinary objective farther away from the anterior lenses thereof.

22. In combination, a goffered film, a color filter and a photographic objective corrected for coma, comprising a collimatric lens, an ordinary objective adapted for use therewith and a negative lens located in front of the anterior focal plane of the ordinary objective, the correction for coma being made by locating the posterior lenses of the ordinary objective farther away from the anterior lenses thereof.

23. In combination, a goffered film, a color filter and a photographic objective corrected for coma, comprising a collimatric lens, an ordinary objective adapted for use therewith and a negative lens located in the neighborhood of the anterior focal plane of the ordinary objective adapted to produce a wider angle for the field and a longer focus for the collimatric lens than with merely the ordinary objective, the correction for coma being made by locating the posterior lenses of the ordinary objective farther away from the anterior lenses thereof.

24. In combination, a goffered film, a color filter and a photographic objective corrected for coma, comprising a collimatric lens, an ordinary objective adapted for use therewith and a negative lens located in front of the anterior focal plane of the ordinary objective adapted to produce a wider angle for the field and a longer focus for the collimatric lens than with merely the ordinary objective, the correction for coma being made by locating the posterior lenses of the ordinary objective farther away from the anterior lenses thereof.

25. A photographic objective, comprising a collimated objective containing at least three lenses, a color filter having a plurality of different colored zones, adapted for use therewith, and a negative lens located in the neighborhood of the anterior focal plane of the objective.

26. A photographic objective, comprising a collimated objective containing at least three lenses, a color filter having a plurality of different colored zones, adapted for use therewith, and a negative lens located in the neighborhood of the anterior focal plane of the objective, the color filter being located within the objective.

ISAAC KITROSER.